May 19, 1964 C. DOBELL ETAL 3,133,659
PRESSURE CONTAINING VESSEL
Filed July 11, 1960 2 Sheets-Sheet 1
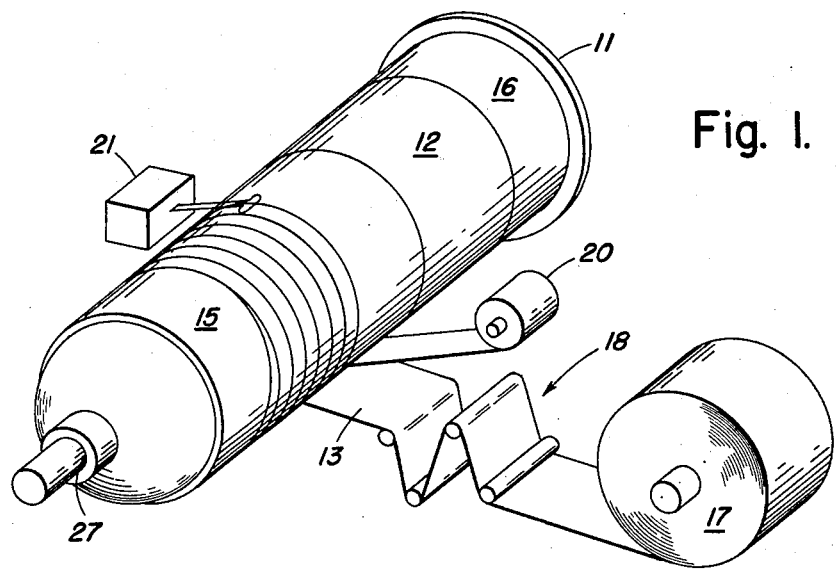
Fig. 1.
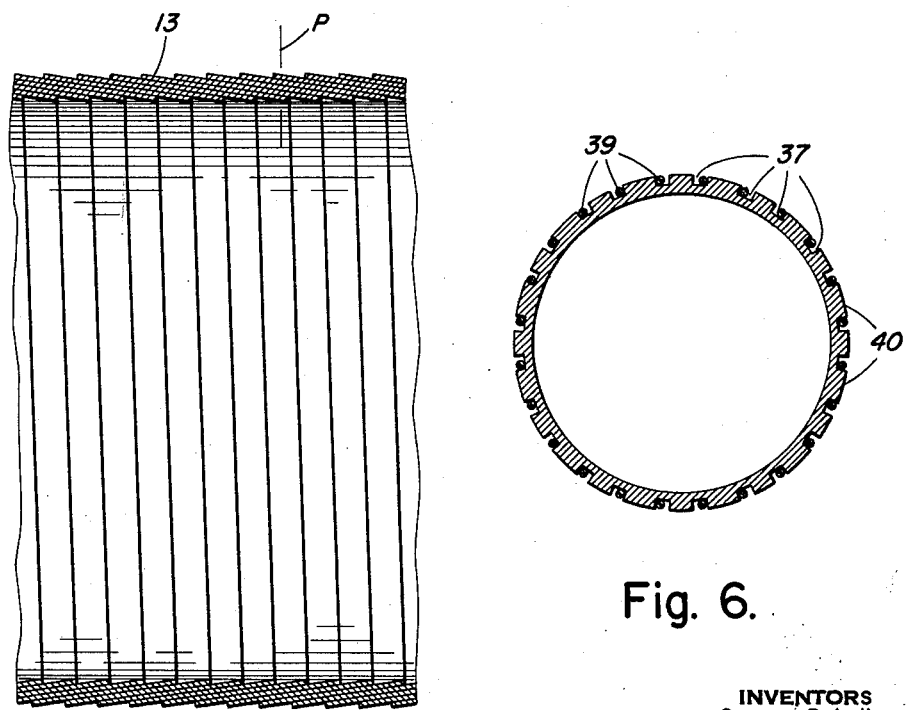
Fig. 3.
Fig. 6.
INVENTORS
Curzon Dobell
Elliott J. Roberts
BY
*Philip Minty*
ATTORNEY

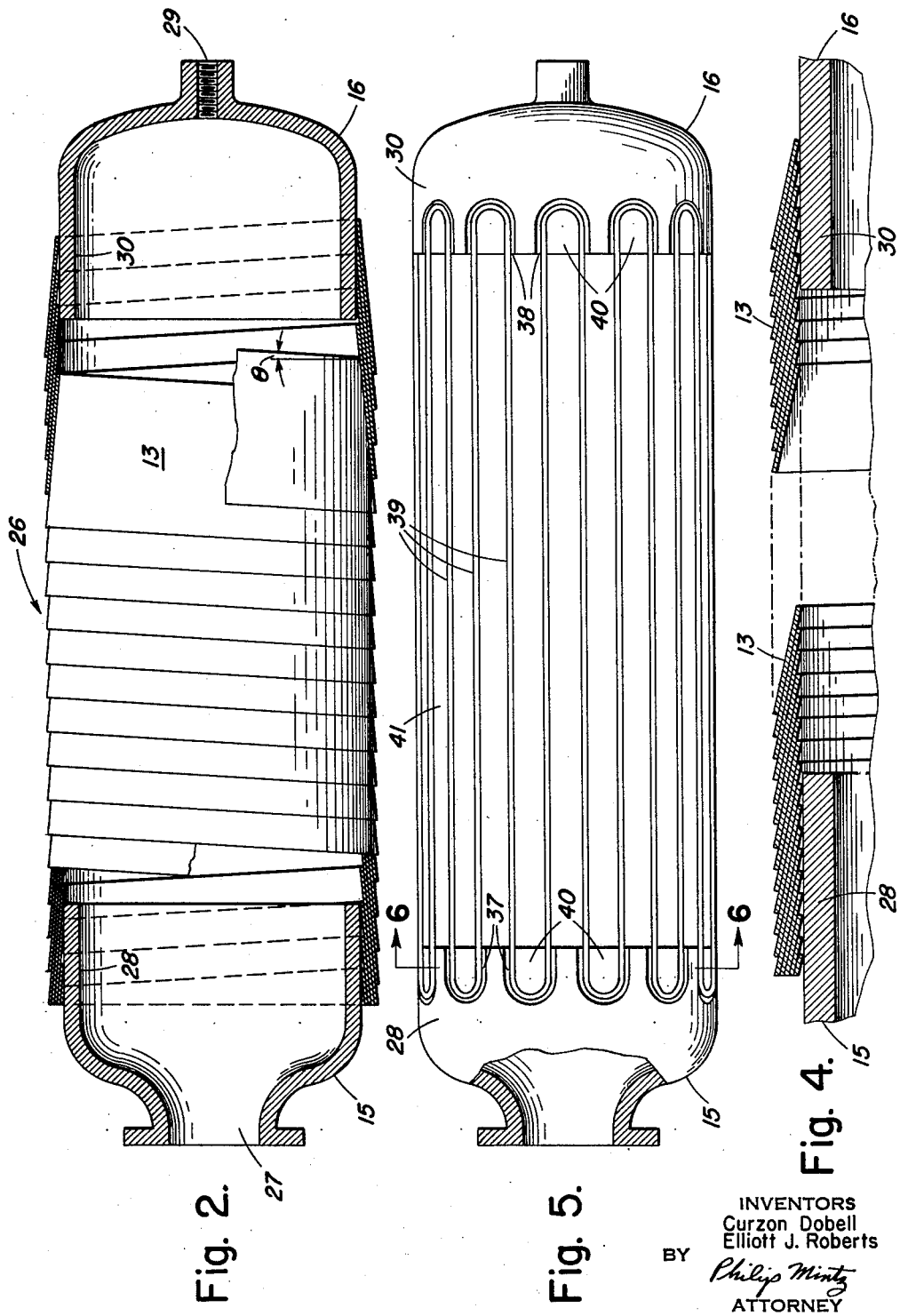

United States Patent Office 3,133,659
Patented May 19, 1964

3,133,659
PRESSURE CONTAINING VESSEL
Curzon Dobell, P.O. Box 643, Nassau, Bahamas, and Elliott J. Roberts, 8 Lyons Plains Road, Westport, Conn.
Filed July 11, 1960, Ser. No. 41,931
13 Claims. (Cl. 220—3)

This invention relates to pressure containing vessels and methods for making them. More particularly, this invention relates to pressure containing vessels of high strength per unit weight having tubular portions made by helically winding strip material.

This application is a continuation-in-part of application Serial No. 852,086, filed November 10, 1959, now abandoned.

Pressure containing vesels have been made in the past from relatively thick sheet metal by bending the metal to cylindrical form and butt-welding, lap-welding, or riveting the two mating edges to each other. Where very large pressure containing vessels were desired, metal sheet of sufficient size could not be obtained. For these vessels, additional joints were required to join smaller sheets into a large enough sheet for forming the cylinder. To this cylinder, ends or heads are then secured by welding or riveting. The weakest portions of such vessels are along the various joints so formed. In order to increase the strength of such joints, previous practice was to make the pressure containing vessels of thicker metal sheets which also increased their weight and cost.

In attempting to reduce the weight of pressure containing vessels several expedients have been tried. The use of strip material of high tensile strength metal helically wound in the manner of ordinary cardboard mailing tube has shown some limited promise by permitting the use of higher strength materials. The objectionable butt-welded joints with their points of weakness are still present however.

Further refinements included the use of a plurality of helically wrapped butt-welded layers over a core of unitary (though weak) construction or over a core of butt-welded construction. The welds of superposed layers were offset from each other to lessen the effects of the weaknesses inherent in the welded joints. These constructions, while better than earlier constructions, still left much to be desired. Obviously, the placing of each layer is a separate operation which consumes extra time and increases costs. Also, while not quite so obvious as in the single layer constructions, points of weakness still exist in the various welded joints. Further, under changes in pressure (as between when the vessel is empty and full), differential expansion of the various layers tends to cause them to slide relative to each other increasing the stresses in the vessel walls.

The present invention has for its object the provision of a novel type of pressure containing vessel and a novel method for its construction which obviates the above disadvantages and produces a product which has a higher strength to weight ratio than any pressure containing vessel previously known. This and other objects which will appear as the specification proceeds is achieved by use of thin continuous strip wound in a helical configuration to overlap itself by at least 50% of the width of the strip and/or to overlap under tension a portion of the end piece or head to which it is secured.

Illustrative of specific embodiments of this invention are the accompanying drawings in which:

FIGURE 1 is a schematic perspective view showing the making of a pressure containing vessel;

FIGURE 2 is a sectional elevation of a completed pressure containing vessel;

FIGURES containing vessel;

FIGURES 3 and 4 are enlarged views of portions of FIGURE 2;

FIGURE 5 illustrates an alternative embodiment using high tensile wire for increased longitudinal strength; and FIGURE 6 is a section view along 6—6 of FIGURE 5.

Referring next to the drawings and more particularly to FIG. 1, there is illustrated the process of making a pressure containing vessel according to the principles of this invention. The term "pressure containing vessel" as used herein is meant to include inter alia conduits such as pipes and tubes, containers such as tanks and gas cylinders, etc.

As seen in FIG. 1, there are several apparatus units utilized in producing a pressure containing vessel. A rotating lathe chuck 11 supports for rotational movement a mandrel 12 on which the pressure containing vessel is formed by helically winding strip material 13. Mandrel 12 is fitted with end pieces 15 and 16 which will form the end portions of the pressure containing vessel. At least one of the end pieces, e.g. 15, is provided with an opening 27 through which mandrel 12 can be removed when the pressure containing vessel is completed. It may be desirable to utilize a collapsible mandrel for ease in removal through constricted opening 27.

Strip material 13 is pulled by rotational motion of mandrel 12 imparted by rotatable chuck 11 from roll 17 through differential tensioning device 18. Differential tensioning device 18 serves to provide a higher tension on the edge of the strip 13 which is to form the outer surface of the pressure containing vessel than on the opposite edge of strip 13 for reasons to be explained later, whereby the outer edge portion of the strip is relatively stretched to accommodate the overlap between the strip winding.

Along with strip 13, fluxed brazing material 20 is wound around mandrel 12 between the overlaps of strip 13. While brazing material 20 may be the full width of the overlap between adjacent layers of strip 13, ordinarily it is sufficient if braze 20 covers only a portion of the overlap. Induction heating unit 21 serves to fuse the brazing material 20 to cause the overlapping portions of strip 13 to braze to each other to form a unitary structure.

Should it be desirable, brazing material 20 may contain non-fusible particles of suitable particle size, which, during brazing, will serve to maintain the proper spacing between laps of the tensioned strip 13 thereby assuring proper thickness of braze. Such non-fusible particles may comprise a powdered abrasive such as Carborundum or a compatible metallic powder such as nickel. Additionally, such powdered abrasive may be used to increase the bonding efficiency by increasing the friction between adjacent laps.

During rotational motion of mandrel 12 and synchronized therewith, a transverse motion is imparted to roll 17 and differential tensioning device 18 to permit strip 13 to be wound about mandrel 12 in a helical configuration having a helix angle $\theta$ as hereafter explained. Such motion may be produced by mounting these units on a lathe carriage coordinated with rotation of lathe chuck 11.

Referring next to FIG. 2, there is shown a pressure containing vessel 26 in the form of a tank constructed in accordance with the principles of this invention. Pressure containing vessel 26 has end portions 15, 16 which may be provided with openings 27, 29 to which may be attached conduits, valves, caps, etc., as may be desired for using the tank. Strip 13 is wound in an overlapping helix between end pieces 15 and 16, said helix having a helical angle $\theta$ which is a function of the pressure which the tank is to withstand as will be explained hereafter.

The strip 13 may be of any suitable material, such as high tensile steel or other metal which is preferably very thin in comparison to the width of the strip. For example, strip 13 might be from .002 inch to .012 inch in thickness and from 1 to 24 inches in width. The braze interlayer would normally be of the order of .001 inch.

FIG. 3 is a schematic representation of a cross-section of the central portion of tank 26, obviously out of proportion and wherein the braze material is not indicated at the interface of the adjacent overlapping laps of strip 13. As is apparent from the above given dimensions of the strip and the braze, an accurate representation with the appropriate proportions is not feasible.

It will further be noted that a plane passed perpendicular to the axis of the pressure containing vessel 26 will slice through a plurality of laps of strip material 13, the number of the laps so sliced being a function of the helix angle $\theta$. As illustrated in FIG. 3 the number of layers cut by plane P is 5.

In designing any pressure containing vessel, the thickness of the walls is computed based upon the strength of the material of construction and the pressure which is to be contained, allowing an appropriate safety factor. In a similar manner, there is computed the thickness of the wall of pressure containing vessel 26 of this invention. Since the thickness of the wall is composed of a plurality of layers of strip material 13 to produce this strength, the number of layers of strip material required to build up the desired thickness may be expressed by the following equation:

$$n = \frac{t}{s}$$

wherein:

$n$ = number of layers cut by plane P,
$t$ = total thickness of strips to give required strength, and
$s$ = thickness of strip 13.

For greatest strength with minimum weight, $n$ as computed is rounded off to the next higher integer. Thus, it is apparent that there will always be at least two layers produced by the strip 13 overlapping itself by at least 50% of the width of the strip.

The number of layers as thus computed is produced as a function of the helix angle $\theta$ determined by the longitudinal motion of differential tensioning device 18 and roll 17 during the winding of strip 13 on rotating mandrel 12. The desired helix angle $\theta$ is computed from the following equation:

$$\tan \theta = \frac{W}{n \pi D}$$

wherein:

$\theta$ = the helix angle,
$W$ = the width of strip material 13,
$D$ = the diameter of the tubular portion of pressure containing vessel 26, and
$n$ = the number of thicknesses of strip material as determined from the preceding equation.

The total thickness of pressure containing vessel 26 constructed as above may be expressed as follows:

$$T = n(s+b) - b$$

wherein:

$T$ = total thickness of pressure containing vessel 26,
$n$ = number of layers cut by plane P as previously defined,
$s$ = thickness of strip 13, and
$b$ = thickness of braze.

As will be apparent from the illustrations taken with the foregoing description thereof, the edge of strip 13 which forms the outer surface of pressure containing vessel 26 must be longer than the other edge of strip 13. This difference in length is approximately $2T/D$ per unit length of strip 13 where the helix angle $\theta$ is relatively small. In the embodiment illustrated, this lengthening of one edge of strip 13 relative to the other edge is performed during winding by means of differential tensioning device 18 to permit strip 13 to track properly during the helical winding operation. Alternatively, the lengthening of one edge of strip 13 relative to the other edge may be accomplished in other fashions, e.g., by manufacturing strip with one edge longer than the other prior to winding on roll 17 or by making strip 13 with a trapezoidal cross-section wherein uniform tension will produce the differential lengthening for proper tracking.

As illustrative examples of pressure containing vessels made in accordance with this invention the following are illustrative:

*Example I*

In making a cylinder 25 inches in diameter and .069 inch thick using strip 12 inches wide and .006 inch thick with braze .001 inch thick, the strip is wound around a mandrel with a helix angle of approximately 0°52.5′ to produce about 90% overlap giving a construction 10 layers thick.

*Example II*

In making a cylinder 80 inches in diameter and .090 inch thick using strip 15 inches wide and .012 inch thick with braze .001 inch thick, the strip is wound around a mandrel with a helix angle of approximately 0°29.3′ to produce slightly over 85.7% overlap giving a construction 7 layers thick.

*Example III*

In making a cylinder 8 inches in diameter and .0265 inch thick using strip 10 inches wide and .004 inch thick with braze .0005 inch thick, the strip is wound around a mandrel with a helix angle of approximately 3°47.6′ to produce slightly over 83.3% overlap giving a construction 6 layers thick.

It is thus seen that the helix angle $\theta$ is readily determinable from the thickness of the wall desired for the pressure containing vessel and the physical dimensions of the product and the raw materials available. It is likewise readily apparent that from the same raw materials, pressure containing vessels having many diverse characteristics can easily be obtained. For example, using strip material 12 inches wide, pressure containing vessels of any length and any diameter can be made in any reasonable thicknesses merely by selecting an appropriate size mandrel 12 and appropriately adjusting the longitudinal movement of differential tensioning device 18 and roll 17 to provide an appropriate helix angle $\theta$.

Referring next to FIG. 4, there is shown the method of affixing the central portion made from strip 13 to end portions 15 and 16.

A tapered end is cut into strip 13 prior to producing the helical winding. The tip of this tapered end portion is secured to a portion 28 of end piece 15. Strip 13 is then wound under tension in a helical configuration onto portion 28 with the tapered end portion of strip 13 serving to progressively build up the desired overlapping configuration substantially as illustrated in the left portion of FIG. 4. Continued helical winding of strip 13 produces the tensioned portion illustrated resting upon portion 28 which is continued through the central portion of the pressure containing vessel.

As the strip winding approaches the other end portion 16 it is wound under tension around portion 30 for a sufficient distance for securement, whereupon strip 13 is severed from roll 17 and the end thereof bonded to the underlying laps.

While the illustrations show end portions 15 and 16 as appropriate for producing a pressure containing vessel in the form of a storage container, many other forms of end portions 15 and 16 could be used. For example, these end portions could be of the form of screwed fittings, flanged fittings for bolting to adjacent sections, etc. so as to form pressure containing vessels for use as pipes or conduits.

Also, while brazing has been illustrated for bonding the overlapping portions of strip 13 to each other, it is within the contemplation of this invention to use other methods of bonding, such as welding, soldering, use of epoxy resins, etc.

In some instances it may be desirable to produce a pressure containing vessel made of a plurality of superimposed layers, each substantially as illustrated in FIGURES 2 and 3 and made substantially as illustrated in FIGURE 1; the plural layers each contributing their strength to the overall vessel. The subsequent layers may be wound to produce helices in the same direction or in the opposite direction from that of the underlying layers.

In FIGS. 5 and 6 an alternative form of this invention is provided for producing greater longitudinal strength to resist the pressures tending to force the end pieces 15 and 16 to separate from the central piece.

End pieces 15 and 16 are provided with U-shaped grooves 37 and 38 in portions 28 and 30 through which high tensile wire 39 is looped around projecting portions 40. When strip material 13 is wound around mandrel 41 in the manner previously described, the high tensile wires 39 become incorporated into the pressure containing vessel, and remain an integral part thereof after removal of mandrel 41. This wire, which may also be bonded to strip 13 in the regions of contact, serves to relieve the shearing stresses in the wall by absorbing part of the longitudinally directed force in pressure containing vessel 26, further minimizing any tendency to rupture at the junctions between the central portion of pressure containing vessel 26 and end pieces 15 and 16.

It is thus seen that there has been provided herein a new and improved pressure containing vessel construction and method of production which permits the manufacture of pressure containing vessels having high strength per unit weight. Additionally, pressure containing vessels of any desired size and shape can be made from the same raw material, i.e. from strip material of the same width and thickness. As pointed out, the thickness of the wall of the pressure containing vessel may be varied by variation in the amount of overlap produced by varying the helix angle during winding.

In this winding operation, provided the strip is wound under sufficient tension, the outer or trailing edge of each winding is at a wider diameter than the inner or leading edge, with the outer edges of the windings laid onto the mandrel in a higher state of tension than the inner edges. Accordingly, with a difference of tension between the edge portions thus established in the strip through lap winding, the outer or trailing edge portion is stretched relative to the inner or leading edge portion to the extent necessary to accommodate the overlap. A very thin gauge strip material of high tensile strength A thus employed on a collapsible mandrel or the like, will produce a pressure cylinder or vessel having the characteristics of light weight and strength set forth above.

While this invention has been described and illustrated in certain embodiments, it is readily apparent that obvious equivalents exist for specific details contained in the illustrative embodiments. It is intended that all such equivalents as may be embraced within the scope of the subjoined claims are to be considered as part of this invention.

We claim:

1. A hollow cylindrical body which comprises helically wound strip material having substantial tensile strength and a large ratio of width to thickness, arranged with the windings thereof tightly wound helically under differential tension one upon the other in overlapping relationship with the overlap large enough to constitute in the resulting cylindrical body a wall thickness containing a plurality of thicknesses of said strip material with the outer edge thereof relatively stretched by said differential tension to accommodate the overlap, and bonding means provided at the interface between the windings for securing them together, said bonding means providing sufficient shear resistance to absorb the longitudinal force imposed upon said wall thickness when the cylindrical body is subjected to tension in the longitudinal direction.

2. A hollow generally cylindrical body which comprises a pair of end members each having an external cylindrical attachment surface, helically wound strip material having substantial tensile strength and a large ratio of width to thickness, arranged with the windings thereof tightly wound helically under differential tension one upon the other in overlapping relationship to constitute a tubular section, and the end portions of the strip material tightly wound around respective cylindrical connecting surfaces of said end members, and the overlap between said windings large enough to constitute a wall comprising a plurality of thicknesses of said strip material, with the outer edge of said strip material relatively stretched by said differential tension to accommodate the overlap, first bonding means provided at the interface between the windings, and second bonding means provided at the respective interfaces between each of the end members and the strip material surrounding them, each of said bonding means effective to provide sufficient shear resistance to absorb the longitudinal force transmitted to said wall from said end members when subjected to tension in the longitudinal direction.

3. A pressure vessel which comprises two end members each providing an outer substantially cylindrical metallic connecting surface, a tubular section coaxially interconnecting said end members and consisting of helically wound metallic strip material having substantial tensile strength and a large ratio of width to thickness, said strip material arranged with the windings thereof tightly wound helically under differential tension one upon the other in overlapping relationship to constitute a tubular section, and the end portions of the strip material tightly wound around respective cylindrical connecting surfaces of said end members, and the overlap between said windings large enough to constitute a wall thickness containing a plurality of thicknesses of said strip material with the outer edge thereof relatively stretched by said differential tension to accommodate the overlap, first brazing means provided at the interface between the windings for securing them to one another, and second brazing means provided between each of the respective end members and the strip material surrounding them, each of said brazing means providing sufficient shear resistance to absorb the longitudinal force imposed upon said vessel due to internal pressure in the vessel.

4. The arrangement according to claim 3, wherein said strip consists of high tensile strength steel of a thickness from about .002 inch to about .012 inch, and is of a width from about 1 inch to about 24 inches.

5. The arrangement according to claim 3, wherein said strip consists of high tensile strength steel of a thickness from about .002 to about .012 with an overlap from about 67% to about 90%, and wherein the composite wall thickness comprises from about 3 layers to about 10 layers of strip material as well as interlayers of braze each of a thickness from about .005 to about .001 inch.

6. The arrangement according to claim 3, wherein the brazing material contains non-fusible particles effective to maintain the proper spacing between the overlaps of the windings of the tensioned strip, assuring proper thickness of the interlayers of braze material.

7. The arrangement according to claim 6, wherein said non-fusible particles comprise a powdered abrasive substance.

8. The arrangement according to claim 6, wherein said non-fusible particles comprise powdered Carborundum.

9. The arrangement according to claim 6, wherein said non-fusible particles comprise a powdered metallic substance.

10. The arrangement according to claim 6, wherein said non-fusible particles comprise powdered nickel.

11. A pressure vessel, which comprises two end members each providing an outer substantially cylindrical connecting surface, a tubular section coaxially interconnecting said end members, consisting of helically wound strip material having substantial tensile strength and a large ratio of width to thickness, and arranged with the windings tightly wound helically under differential tension one upon the other in overlapping relationship to constitute a tubular section, and with the end portions of the strip material tightly wound around respective cylindrical connecting surfaces of said end members, the overlap between said windings being large enough to constitute a wall thickness containing a plurality of thicknesses of said strip material with the outer edge thereof relatively stretched by said differential tension to accommodate said overlap, first bonding means provided at the interface between the windings for securing them together, and second bonding means provided at the respective interfaces between each of the end members and the strip material surrounding them, each of said bonding means effective to provide suffiicent shear resistance to absorb the longitudinal force imposed upon said vessel due to internal pressure in the vessel.

12. The method of making a hollow cylindrical body, which comprises providing a mandrel which is collapsible, providing strip material having substantial tensile strength and a large ratio of width to thickness, detachably connecting one end of said strip material relative to said mandrel, helically winding said strip material tightly around said mandrel at a helix angle selected to effect an overlap between the strip windings sufficiently large to provide a plurality of thicknesses of said strip material to constitute a selected wall thickness in the resulting hollow cylindrical body while maintaining in said strip material a tension force during the winding operation so distributed that significantly greater stress is imposed upon the trailing edge portion than upon the leading edge portion of the strip material, thereby producing a relative stretch in the trailing edge portion to accommodate the overlap, bonding the windings to one another at the helical interface between the overlapping portions of the strip material, and collapsing said mandrel as well as disconnecting said one end of the strip material relative thereto for removal thereof from said hollow body.

13. The method of making a pressure vessel, which comprises providing a mandrel which is collapsible, providing two end members located one at each end of the mandrel coaxial therewith and detachably connected thereto, each end member having an outer cylindrical connecting surface registering with the cylindrical surface of the mandrel, providing strip material having substantial tensile strength and a large ratio of width to thickness, helically winding said strip material tightly around said one end member and continuing the winding around said mandrel and then around the cylindrical surface of the other end member, with the helix angle selected to effect an overlap between the strip windings sufficiently large to provide a plurality of thicknesses of said strip material to constitute a selected wall thickness in the resulting hollow body of the vessel, while maintaining in said strip material a tension force during the winding operation so distributed that significantly greater stress is imposed upon the trailing edge portion than upon the leading edge portion of the strip material, thereby producing a relative stretch in the trailing edge portion to accommodate the overlap, bonding the windings to one another at the helical interface between the overlapping portions of the strip material, as well as at the interface between said end members and said strip material surrounding them, and collapsing said mandrel as well as disconnecting said end members therefrom for removal thereof from said vessel.

References Cited in the file of this patent

UNITED STATES PATENTS

| | | |
|---|---|---|
| 1,270,891 | Snyder | July 2, 1918 |
| 1,350,666 | Murphy | Aug. 24, 1920 |
| 1,488,128 | MacDonald | Mar. 25, 1924 |
| 1,700,937 | Kondolf | Feb. 5, 1929 |
| 2,054,939 | Larson | Sept. 22, 1936 |
| 2,109,529 | Goddard | Mar. 1, 1938 |
| 2,160,680 | Sandberg | May 30, 1939 |
| 2,288,094 | Karmazin | June 30, 1942 |
| 2,335,153 | Lauck | Nov. 23, 1943 |
| 2,365,697 | Grubb | Dec. 26, 1944 |
| 2,631,015 | Probst | Mar. 10, 1953 |
| 2,723,705 | Collins | Nov. 15, 1955 |
| 2,785,878 | Conrad | Mar. 19, 1957 |
| 2,814,313 | Tate | Nov. 26, 1957 |
| 2,909,643 | Graves | Oct. 20, 1959 |
| 2,924,546 | Shaw | Feb. 9, 1960 |

FOREIGN PATENTS

| | | |
|---|---|---|
| 117,303 | Great Britain | July 12, 1918 |
| 119,372 | Great Britain | Oct. 3, 1918 |